United States Patent
Kudelski et al.

(10) Patent No.: US 7,908,491 B2
(45) Date of Patent: Mar. 15, 2011

(54) METHOD AND DEVICE FOR CONTROLLING ACCESS TO ENCRYPTED DATA

(75) Inventors: Henri Kudelski, Grandvaux (CH); Jimmy Cochard, Attalens (CH)

(73) Assignee: NagraCard S.A., Cheseaux-sur-Lausanne (CH)

( * ) Notice: Subject to any disclaimer, the term of this patent is extended or adjusted under 35 U.S.C. 154(b) by 710 days.

(21) Appl. No.: 11/994,485

(22) PCT Filed: Jul. 6, 2006

(86) PCT No.: PCT/EP2006/063988
§ 371 (c)(1),
(2), (4) Date: Jan. 2, 2008

(87) PCT Pub. No.: WO2007/006735
PCT Pub. Date: Jan. 18, 2007

(65) Prior Publication Data
US 2008/0209232 A1    Aug. 28, 2008

(30) Foreign Application Priority Data

Jul. 7, 2005  (EP) .................................. 05106185

(51) Int. Cl.
*H04L 9/00* (2006.01)
*H04N 5/00* (2011.01)
*H04N 5/913* (2006.01)
*H04N 7/167* (2011.01)

(52) U.S. Cl. ............ 713/193; 709/200; 380/37; 380/202
(58) Field of Classification Search .................... 713/193
See application file for complete search history.

(56) References Cited

U.S. PATENT DOCUMENTS
5,461,675 A    10/1995    Diehl et al.
(Continued)

FOREIGN PATENT DOCUMENTS
EP    0866613 A1    9/1998
(Continued)

OTHER PUBLICATIONS

"Countermeasures for Attacks on Satellite TV Cards using Open Receivers", L. Francis, W. G. Sirett, K. Mayes, K. Markantonakis, Conference in Research and Practice in Information, Australian Computer Society, Inc, Jan. 2005, pp. 1-6.*
International Search Report, International Patent Application No. PCT/EP2006/063988, Filing Date: Jul. 6, 2006.
(Continued)

*Primary Examiner* — Ashok B Patel
*Assistant Examiner* — Joseph Gazda
(74) *Attorney, Agent, or Firm* — DLA Piper LLP US (57) ABSTRACT

The invention concerns a method for controlling access to encrypted data by control words (CW), said control words being received by a security module in control messages (ECM) and returned to a unit operating on (STB) the encrypted data. The method includes the following steps: receiving a first control message (ECM) comprising at least one control word (CW) and a time stamp (TS), receiving a second control message (ECM2) consecutive to the first control message (ECM1), said second message comprising at least one control word (CW) and a time stamp (TS), determining a duration corresponding to the difference between the time stamps (TS) of the two consecutive control messages (ECM1, ECM2), if said duration is less than a predefined duration (CP), incrementing an error counter (CE), and if said duration is not less than said predefined duration, decrementing said error counter (CE), returning the control word (CW) to the operating unit (STB) after a waiting time depending on the value of the error counter (CE).

17 Claims, 3 Drawing Sheets

U.S. PATENT DOCUMENTS

2004/0215691 A1* 10/2004 Maria Van De Ven
et al. .............................. 709/200
2005/0025312 A1* 2/2005 Rijkaert et al. ................. 380/37
2007/0076872 A1* 4/2007 Juneau .......................... 380/202

FOREIGN PATENT DOCUMENTS

| | | |
|---|---|---|
| EP | 1353511 A2 | 10/2003 |
| EP | 1441525 A1 | 7/2004 |
| EP | 1575293 A1 | 9/2005 |
| WO | 99/57901 | 11/1999 |
| WO | 03/069910 A1 | 8/2003 |

OTHER PUBLICATIONS

Francis, L., et al., "Countermeasures for Attacks on Satellite TV Cards Using Open Receivers," Australian Computer Society, Inc., Third Australasian Information Security Workshop (AISW2005): Digital Rights Management, Newcastle, Australia, Conferences in Research and Practice in Information Technology, vol. 44, 2005.

"Functional Model of a Conditional Access System," EBU Project Group B/CA, EBU Technical Review, 1995.

"McCormac Hack Over Cablemodem: Dateline2200 Hrs Aug. 10, 1998," HackWatch, Retrieved: Dec. 24, 2007, <http://www.hackwatch.com/cablemodhack.html>, 1998.

* cited by examiner

200
METHOD AND DEVICE FOR CONTROLLING ACCESS TO ENCRYPTED DATA

TECHNICAL FIELD

The present invention relates to a method and a device for controlling access to data encrypted by control words, these control words being received in control messages by a security module and returned to a processing unit for encrypted data.

The present method and device are applied in particular in the field of the Pay-TV.

PRIOR ART

In a well-known method, in particular in the aforementioned field of Pay-TV, data is encrypted by a data supplier by means of encryption keys called control words. This data is transmitted to multimedia units of users or subscribers. Parallel to this, the control words are transmitted to these multimedia units in the form of a stream of control messages.

The multimedia units are generally made up of a processing unit that, in the case of Pay-TV, is a decoder receiving the aforementioned stream and of a security module responsible for the cryptographic operations related to the use of these streams.

As is well known to those skilled in the art, this type of security module can essentially be produced according to four distinct forms. One of these is a microprocessor card, a smart card, or more generally an electronic module (in the form of a key, of badge, . . . ). This type of module is generally removable and can be connected to the decoder. The form with electrical contacts is the most widely used, however the use of a contactless connection is not excluded, for example of the ISO 14443 type.

A second known form is that of an integrated circuit box placed, generally in a definitive and irremovable way, in the decoder box. One variant is made up of a circuit mounted on a base or connector such as a SIM module connector.

In a third form, the security module is integrated into an integrated circuit box also having another function, for example in a descrambling module of a decoder or the microprocessor of a decoder.

In a fourth embodiment, the security module is not materially produced, but rather its function is only implemented in the form of software. Given that in the four cases, although the security level differs, the function is identical, it is possible to talk about a security module regardless of the way in which it functions or the form that this module may take.

When a multimedia unit has received the stream containing the control words, first it is verified if the user disposes of the rights to decrypt the specific data. If this is the case, the control messages are decrypted in order to extract the control words. These control words are in turn used to decrypt the data.

As is also known, each control word generally allows a small part of the data transmitted to be decrypted. Typically, one control word allows 10 seconds of a Pay-TV event to be decrypted. After this time duration, called a cryptoperiod, the control word is changed for security reasons.

One possible way to enjoy access to encrypted data without being authorised consists in using a genuine multimedia unit with a real security module, but distributing the control words to a set of decoders. This can be done by means of a server or separating device known as a "splitter". Therefore, the amounts related to the acquisition of access rights to encrypted data are paid by a single multimedia unit while the events are accessible from several multimedia units.

European Patent Application EP 1 575 293 describes a method intended to prevent a security module from being shared by several users. For the implementation of this method, the security module has available a memory intended to memorise control message sequences. The security module also disposes of means to analyse an abnormal command message sequence, these means working by comparing the memorised control messages. When an abnormal sequence is detected, an error counter is incremented. A time delay in the processing of the control words is introduced according to the value of the error counter.

In the method described in this patent application, abnormal behaviour is defined on the basis of the analysis of the channels used. As an example, if the channel identifier is alternatively A then B, the analysis means assess that this concerns an abnormal sequence relating to the sharing of the security module. The error counter is then incremented. On the contrary, if the channel identifier is A for several cryptoperiods, then passes to B for several cryptoperiods, it will not be considered as abnormal behaviour and the error counter will not be incremented.

The invention described in patent application US 2004/0215691 intends to prevent this fraudulent use. In order to achieve this, each time a control message is received by a multimedia unit, this unit or the security module to which it is associated determines to which channel this control message is related. The channel identifiers are memorised with a time information. The messages are compared in order to determine if they are related to different channels or to the same channel. If they are related to different channels, a counter is incremented by a certain value. If the control messages are related to the same channel, the counter is decremented. If the counter reaches an established threshold value, this means that many channel changes have occurred and the decrypting of control words is stopped.

The two processes described in the document EP 1 575 293 and US 2004/0215691 imply that it is necessary to have an identifier of the channel concerned for each control message at your disposal. In certain configurations, this is not the case. By using the control messages as defined in particular in the Eurocrypt N° EN 50094 standard of December 1992, it is possible to identify a class of channels rather than each channel. In this case, it is impossible, with the invention described above, to block the use of several multimedia units that use only one security module and a splitter.

The document "Countermeasures for Attacks on satellite TV cards using open receivers" XP-002333719 by Francis et al. describes in a very general way, different means for avoiding the fraudulent use of security modules. According to one particular aspect, this document suggest verification of whether the time stamp of a message is situated in the future in relation to the time stamp of a message received previously. However, this document does not mention any concrete solution. In particular, there is no information allowing a distinction to be made between the illegal use of a security module by several users and a legal channel change by only one user.

SUMMARY OF THE INVENTION

This invention proposes to realise an alternative solution to that of the prior art, in which the use of a channel identifier is avoided, while preventing the use of a separating device that allows several decoders to access an encrypted content from one security module. Moreover, according to this solution, an identifier of the channel concerned is not necessary, since this solution also operates in the case where the control messages do not contain. such a channel identifier, but where the channels are grouped by class, for example.

The aim of the invention is achieved by means of a method for controlling access to data encrypted by control words, these control words being received in control messages by a security module and returned to a processing unit for encrypted data, this method comprising the following steps:

reception of a first control message comprising at least one control word and a time stamp, reception of a second control message following the first control message, this message second comprising at least one control word and a time stamp, determination of a time duration corresponding to the difference between the time stamps of the two consecutive control messages, if this time duration is lower than the predefined time duration, the error counter increments, if this time duration is equal to or greater than said predefined duration, said error counter decrements.

The aim of the invention is also achieved by means of a device for controlling access to data encrypted by control words, these control words being received in control messages by a security module and returned to a processing unit for encrypted data, this device comprising:

reception means of a first control message comprising at least one control word, reception means of a second control message consecutive to the first control message, this second message comprising at least one control word, means to determine a time duration separating the two consecutive control messages, means to increment an error counter if this time duration is lower than the predefined time duration, means to decrement said error counter if this time duration is equal to or greater than said predefined time duration.

In general, the method and the device according to this invention makes it possible to determine, according to the time information related to the control messages sent by a management centre, if these control messages are sent and processed according to a fraudulent or conventional use. The error counter allows measures to be taken when abnormal use is detected. There are different types of measures, such as the momentary interruption of a service, delay in returning the control words, or even the locking of the security module, in which case unlocking can be carried out either automatically or on request through a telephone service. In the case of conventional use, the user will not notice any change due to the use of this method. Conventional use is understood to indicate both the access to an encrypted content on a determined channel as well as a channel change (zapping) at a rhythm and during a "reasonable" time duration. On the contrary, in the event of the fraudulent use of a separating device that is supplying several decoders from only one security module, access to the encrypted content rapidly becomes impossible. When use is again correct, access to data can be authorised again.

BRIEF DESCRIPTION OF THE DRAWINGS

This invention and its advantages will be better understood with reference to the Figures enclosed and to the detailed description of a particular embodiment given as an non-limitative example, in which.

METHODS FOR CARRYING OUT THE INVENTION

Figure 1:
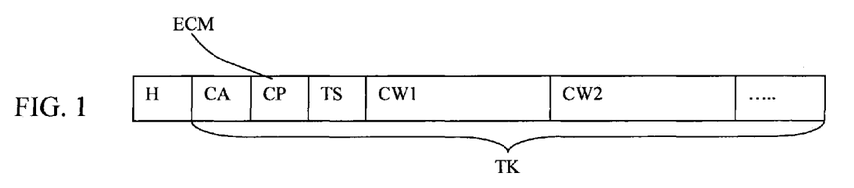
FIG. 1 shows an example of the structure of a control message such as that used in the present invention.

FIG. 1 schematically shows the content and the structure of a control message ECM as used in the present invention. This control message ECM contains fields in which a time stamp representing a date and a time, the duration of the cryptoperiod CP, access conditions CA to audio/video content and two control words CW1, CW2, of different parity are found in particular. The control message can also comprise other fields not described in detail here. The data contained in the fields of the control message is generally encrypted by a transmission key TK. This message can also comprise one or more headers that are not necessarily encrypted. In particular, such a message includes a header H that allows the multimedia unit to identify it as a control message ECM and which must not be encrypted. It should be noted that the cryptoperiod is not necessarily contained in such a control message.

In fact, if the cryptoperiods of the different channels are identical and remain constant during a certain period of time, the cryptoperiod can be sent in a management message EMM.

According to a first embodiment, this invention functions in the following general way. Conventionally, a control message ECM is sent to a multimedia unit comprising a decoder STB and a security module SC. On receipt of this control message, the access conditions CA required to access a determined content, called hereinafter audio/video content, are extracted from this control message by the security module. Then, the security module verifies if it has available the rights to return the control word. If this is not the case, it does not return the control word. If the decryption rights are present, the control word is transmitted to the decoder.

The value of the cryptoperiod CP is also extracted from the control message or determined in another way. This value CP is memorised in a memory connected to the security module. The appropriate control word is returned to the decoder, generally in an encrypted form, by a session key. The session key is generally derived from a pair of asymmetric keys in which one of the keys is memorised in the security module and in which the other is memorised in the decoder. The keys of this key pair are called pairing keys and in principle are different and unique for each multimedia unit. The encrypted content can then be decrypted by this control word and displayed on a user's screen. The pairing mechanism is described in detail in the European patent published with the N° EP 1 078 524.

When a further control message is received by the multimedia unit, it is decrypted in such a way as to extract among others, the time stamp TS.

This time stamp is compared with the time stamp memorised during the processing of the previous control message. The difference between these two time stamps is compared with the cryptoperiod also memorised at the time of the processing of the previous control message. If this difference is lower than the value of the cryptoperiod, it means that the multimedia unit has received more than one message per cryptoperiod and a counter value is incremented. This counter, called an error counter CE in the following description, is in principle placed in the security module. The incrementation of this counter is thus carried out when the security module is required to return control words according to a frequency greater than the cryptoperiod, either by a user changing channel, or by the functioning of more than one multimedia unit on the same security module.

Figure 2:
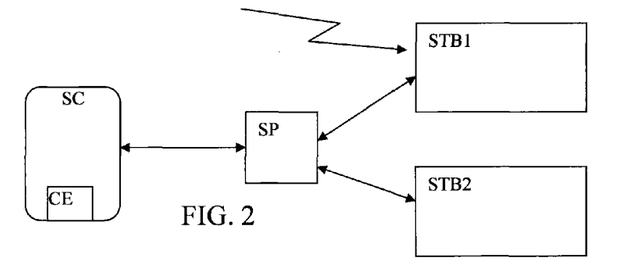
FIG. 2 shows a configuration in which two decoders are used with only one security module and a separating device, FIG. 3 schematically represents an embodiment of the decryption process according to this invention.

FIG. 2 represents a configuration against which this invention intended to fight. In this configuration, two data processing devices or two decoders STB1, STB2 are supplied with control words by only one security module and a separating device. In this configuration, when one of the decoders receives a control message ECM, it transmits it to the separating device SP which sends it back it in turn to the security module SC. The latter decrypts said message if it is authorized to do so, then transmits the control word to one of the decoders STB1 or STB2 by means of the separating device SP.

In this FIG. 2, only two decoders are represented. In theory, it is possible for a larger number of decoders to be supplied with control words by only one security module and a separating device.

It should be noted that the process only controls time durations related to control messages ECM. If message of other types, for instance management messages EMM are sent between two control messages, these other message types are not taken into consideration and do not disturb the functioning of the process.

Use of Error Counter Data

A particular embodiment example is described below with reference to FIG. 3. In this embodiment, the value of the error counter CE is used to introduce a time delay in the returning of the control words CW extracted from the control messages ECM. In the example in FIG. 3, we use the hypothesis that the cryptoperiod is 10 seconds. On receipt of a first control message ECM1, the latter is processed in such a way that the control words that it contains, respectively called CW1(C1) and CW2(C1), are extracted. It should be noted that in the Figure, the upper part corresponds to channel C1 and the lower part corresponds to channel C2. In order to avoiding including too much detail in this Figure, the control word CW1(C1) corresponding to channel C1 is simply marked CW1. Likewise, the control word CW1(C2) corresponding to channel C2 is also marked CW1 in the Figure. Due to their position in the Figure, the distinction between these two control words is evident. In the description, the channel identifier is indicated in brackets.

The processing of the control message ECM1 generally lasts a few tens of milliseconds. While one of the control words, for example the control word CW1(C1) is used, the other control word CW2(C1) contained in the same control message ECM1 is memorised. The control message corresponding to the same channel will in general contain the control word memorised during the processing of the previous message, as well as an additional control word which is provided for use during the following cryptoperiod. In this way, each control word is sent twice. This working method presents the advantage that the control words different from those received immediately after a channel change are memorised before being used, therefore being immediately available when necessary.

The error counter CE introduces a time delay in the return of the security module control words to the decoder. This means that instead of processing a control message ECM and returning the control words as soon as these have been extracted, the sending of said control words to the decoder is delayed for a time duration that depends on the value memorised in this counter.

Figure 3:
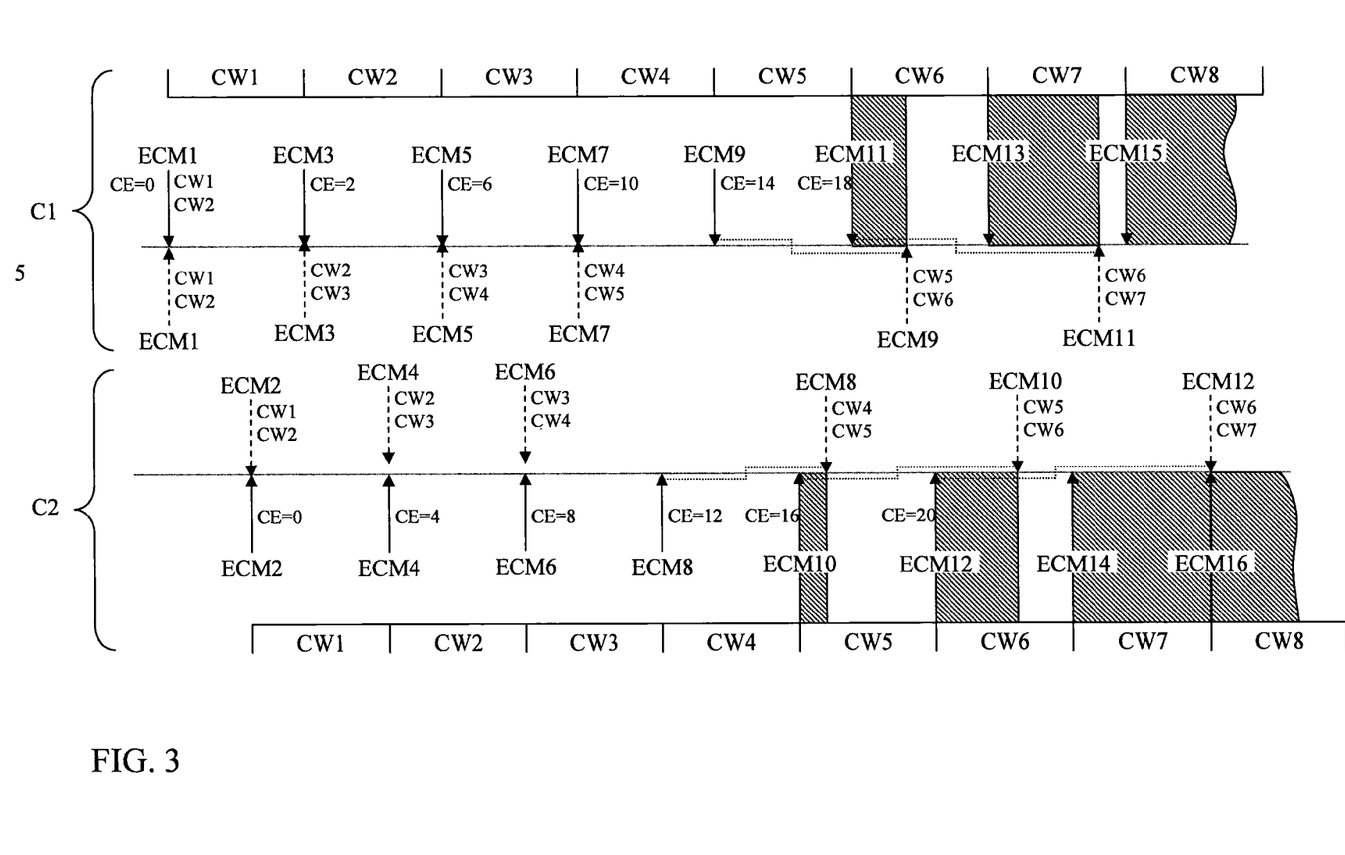

FIG. 3 represents an example where a separating device (splitter) is used illegally between the security module and two decoders STB1 and STB2. In the most simple case where the cryptoperiods are identical and where the users do not change channels, with the configuration described above, two control messages will be received for each cryptoperiod. Therefore, for each cryptoperiod, the value of the error counter CE will be incremented. This incrementation can be made according to predefined values, for example of two units. As an example, imagine that a time delay is introduced for the processing of the control messages of 1 second per unit of the error counter from the moment when this value exceeds a threshold of 10. When the counter has still not reached this threshold of 10 or equal to 10, no time delay is introduced.

If the initial value of the counter is zero (CE=0), on receipt of a first control message ECM1 the value of the cryptoperiod CP, for example 10 seconds, will be memorised. The control words CW1(C1) and CW2(C1) are decrypted. The control word CW1(C1) is used to decrypt an audio/video content and the control word CW2(C1) is memorised for subsequent use. The time stamp TS=T0 is extracted from control message and memorised. When the following control message ECM2 is received by the multimedia unit, the latter extracts the time stamp T1. The second control message ECM2 is processed in order to extract the control words, to use the first of them CW1(C2) and to memorise the other CW2(C2). Then, the difference between T0 and T1 is calculated and for example 6 seconds is obtained.

This value is compared to the memorised cryptoperiod CP that is, in our example, 10 seconds. Given that the difference of the time stamps T1−T0 is lower than the cryptoperiod CP, the error counter value CE is incremented, in our example by 2 units. This value is thus 2.

On reception of the following control message ECM3, corresponding to the first channel C1, the error counter value CE is verified. As this value is 2 and thus lower than the threshold value of 10 previously defined, no time delay is introduced. The security module processes the message by first extracting the time stamp TS=T2. As the cryptoperiod is 10 seconds, the result is T2−T0=10. As T1−T0=6 in this example, T2−T1=4 seconds. Since this value is lower than the cryptoperiod, the error counter value is incremented by two units and passes to 4. The control words CW2(C1) and CW3 (C1) are extracted from the message. During this time, the audio/video content is decrypted using the control word CW2 (C1) originating from the previous control message.

On receipt of the following control message ECM4, the security module also processes the message and returns the control words without introducing a time delay. During this time, the decoder STB2 uses the control word CW2(C2) originating from the previous message to decrypt the audio/video content.

The difference between the time stamp of this message and of the previous is 6 seconds, thus lower than the cryptoperiod. The value of the error counter CE is incremented by two units and is thus worth 6. The control words CW2(C2) and CW3 (C2) are extracted from the message. When the audio/video content must use the control word CW3(C2) in order to be decrypted, this control word will be available as it has been decrypted in the control message received previously ECM4.

The multimedia unit will then receive a fifth control message ECM5, containing the control words CW3(C1) and CW4(C1). During this time, the control word CW3(C1) can be decrypted in order to access the audio/video content, as this control word has already been sent in the previous control message ECM3. As the difference between the time stamp of the control message ECM4 and of the message ECM5 is lower than the cryptoperiod, the error counter value is incremented by 2 units and passes to 8.

Similarly, the following control message ECM6 contains the control words CW3(C2) and CW4(C2) that can be used to decrypt the audio/video content. The time stamp contained in this message means that the error counter is incremented by 2 units in order to pass to 10.

The following control message ECM7 contains the control words CW4(C1) and CW5(C1). Since the error counter contains the value 10 that is equal to the threshold value, but not greater than this value, the message ECM7 is processed in order to return the control words immediately. This means that the control word CW5(C1) will be available at the necessary moment for the audio/video content. The error counter will be incremented again by 2 units to pass to 12, thus exceeding the threshold value.

The following control message ECM8 contains the control words CW4(C2) and CW5(C2). This message is processed immediately, but the control words that it contains will not be returned until after a 12 second waiting time. This means that with a cryptoperiod of 10 seconds, the control words are returned 2 seconds after the end of the cryptoperiod. During these two seconds, the control word which is necessary to access the audio/video content is the word CW5(C2). However, this control word is not accessible before being returned to the decoder. The result is that during these two seconds, the audio/video content is not accessible. The result for the user's screen may be a scrambled image or a uniformly black or white screen.

The process continues in this way by adding 2 units to the error counter and accordingly two seconds to the return time of the control words. Therefore, during the processing of the following control message ECM9, the audio/video contents will not be accessible for 4 seconds. For the consecutive messages ECM10, ECM11 and ECM12, the time during which access to the audio/video content is impossible is 6 seconds, 8 seconds and 10 seconds respectively. As one can easily notice, when the time delay is equal to twice the cryptoperiod, the content is no longer accessible.

The time stamp TS such as described above can have a "resolution" of approximately a second, or even of a few seconds, for example 4 seconds in theory. This means that the difference between two time stamp values will also be expressed in seconds and not in fractions of seconds.

It should be noted that the example described above uses a time given by the time stamps. If the multimedia unit, that is to say the security module and/or the decoder contain a clock, it is of course possible to calculate the difference between two times provided by the clock and no longer between two time values. In both cases, the principle of the invention however, remains the same.

Use of a Buffer Memory

The system as described above presents a limitation when a buffer memory is used to memorise the audio/video content in order to compensate the delay induced by the security module and thus rendering the content inoperative.

One of the methods for rendering this memorisation useless or at least ineffective consists in not fixing an upper limit on the delay induced by the error counter or in fixing a very high limit. In this way, since the error counter increases by two for each unconventional control message, it will practically always reach a value over twice the cryptoperiod or even more in such a way as to exceed the interval introduced by the buffer memory. Henceforth, the totality of the audio/video content is no longer accessible. However, this can present a drawback. In fact, if the error counter reaches a considerable value, it is necessary to wait during a considerable time duration after the splitter has been stopped, in order to make the error counter decrement sufficiently for the system to operate again correctly.

Another way for making this memorisation ineffective consists in not returning the control words which, taking into account the delay, should be sent within a period during which the content is no longer encrypted by control words supposed to be sent by the security module. As an example, the control message with the reference ECM8 in FIG. 2 contains the control words CW4(C2) and CW5(C2). With the error counter value of 12, these control words should be returned after the end of the cryptoperiod. In this case, these control words are simply not returned. Since the control word CW4(C2) is contained in the message ECM6, the audio/video content can be decrypted up until the end of the cryptoperiod using these control words. Once the following change has been carried out, the content will no longer be accessible. However, the error counter continues to be incremented since the sending frequency of the control messages has not been modified.

Counter Decrementation

In the unauthorised use mode described previously, it is clear that if two users have access at the same to the security module in order to decrypt data, this data will rapidly become inaccessible. If one of the users stops accessing the security module, provision can be made for the "legal" user to be able to have access to this content again. For this reason, the proposed solution consists in decrementing the error counter CE according to preset rules.

Figure 4:
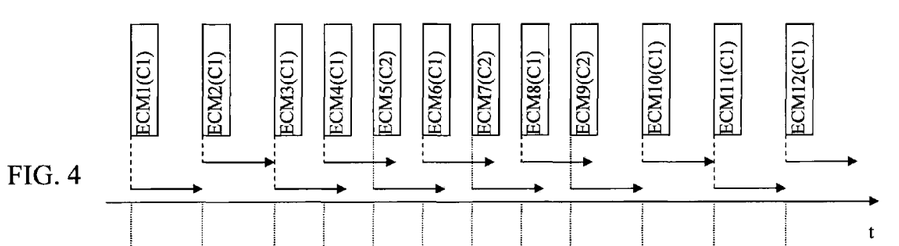
FIG. 4 shows the reception of the control message ECM according to time.
Figure 5:
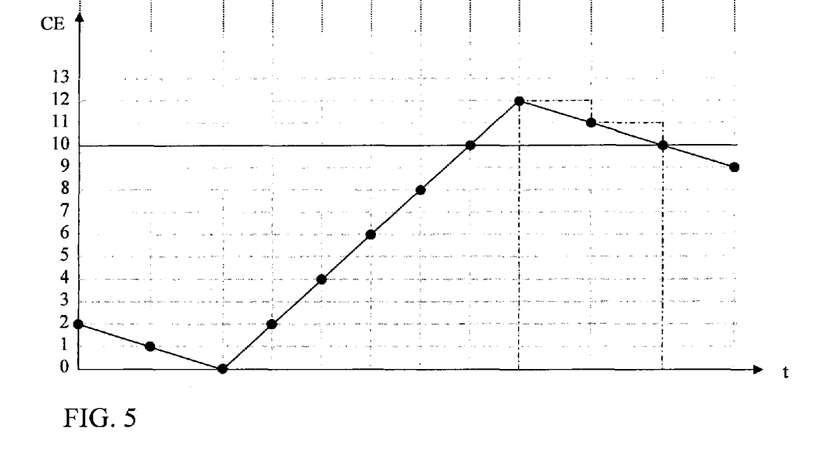
FIG. 5 represents an error counter value according to time and the control messages received as illustrated in FIG. 4.

FIGS. 4 and 5 schematically illustrate the decrementation of the error counter as well as its incrementation according to the cryptoperiod CP and the difference between the time stamps of two successive control messages ECM. According to one possible rule, each time a control message ECM is received correctly, that is to say when the difference between the time stamp of a given message and of the previous message is equal to the cryptoperiod, the error counter is decremented by one unit.

As an illustration, FIG. 4 represents the control messages ECM received during the time while FIG. 5 shows the value of the error counter CE also according to the time.

It should be noted that in this example, the initial value of the error counter is not zero, but has been fixed to 2. Given that no delay is introduced as long as the threshold value has not been exceeded, this initial non-zero value has no negative effect on decryption. On the contrary, the effect of this will be that in the case of fraudulent use, the threshold value from which a delay is introduced is reached faster.

The return of the control words contained in the first control message is not delayed since the threshold value is not reached. The first control word allows the audio/video content to be accessed. The second control word is memorised by the decoder. At the end of the cryptoperiod, a new control message ECM2 is received by the multimedia unit. By comparing the time stamp of the two messages with the cryptoperiod of the first control message ECM1, it appears that the cryptoperiod is equal to the difference between the time stamps contained in the control messages. At this moment, the error counter CE value is decremented according to the preset rule, in this case of one unit. Thus, it is has the value of 1.

When the following control message is received by the multimedia unit, the error counter value is verified. This is worth 1. Therefore, no time delay is applied. During this time, the control word memorised previously originating from the previous control message is used to access the audio/video content. The value of the counter is decremented according to the preset rule and now takes a value of zero.

In the example illustrated, the multimedia unit receives a new control message ECM4 where the difference between the time stamp of this message and of the previous message is lower than the cryptoperiod. At this moment, the value of the counter is incremented by 2 units to pass to 2. This increment can take place for two different reasons. According to one of these reasons, the user changes channel (zapping). According to the other reason, a splitter is used. As already explained with reference to FIG. 3, the value of the counter increases, for example two by two.

In the example of FIGS. 4 and 5, the difference between the time stamps of two consecutive control messages ECM is lower than the cryptoperiod until the control message with the reference ECM8. The error counter value increases by two by two until reaching the value 12. As indicated with reference to FIG. 3, when this counter value exceeds 10, a delay time in the return of the control words is introduced. Thus, the user not will have access to the totality of the audio/video content. In FIGS. 4 and 5, at the time of the reception of the control messages ECM9 to ECM12, the difference between the time stamp is equal to the cryptoperiod and the error counter CE value is thus decremented by 1 for each message. As soon as this counter value reaches 10, the time delay for processing is cancelled and the totality of the audio/video content is accessible to the user.

Figure 6:
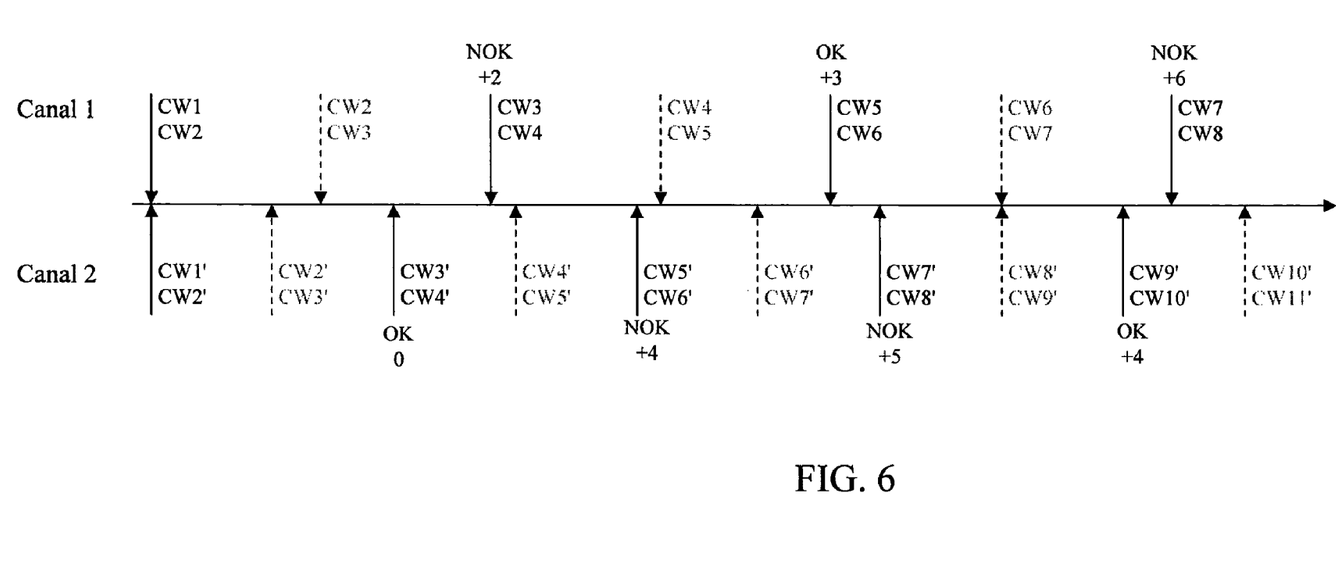
FIG. 6 shows a variant of the invention in which different cryptoperiods are used on different channels.

FIG. 6 illustrates a particular embodiment of the invention according to which the cryptoperiods differ from one channel to another. In this Figure, it is also supposed that the invention device is used fraudulently to supply two decoders from only one security module and that furthermore, each channel only receives one control message of two. This use of one control message of two is possible due to the fact that each of these messages contains two control words. Therefore, also in this case, all the control words will be available for the two channels.

As an example, it is supposed than the cryptoperiod of channel 1, represented in the upper part of FIG. 6, is 7 seconds long. The cryptoperiod of channel 2, represented in the lower part of the Figure, is 5 seconds long. We will consider the case where the first control messages of each channel C1 and C2 are simultaneously received. The first control message ECM1 (C1) of channel 1 contains an indication according to which the cryptoperiod is 7 seconds long. This message contains the control words CW1(C1) and CW2(C1).

The first control message of channel 2 contains a cryptoperiod value of 5 seconds as well as the control words CW'1 (C2) and CW'2(C2).

In the example represented in FIG. 6, the following control messages of each channel are not used. The next message to be used is the control message with reference ECM2(C2). This message is received two cryptoperiods after the first message ECM1(C2) so that it is considered as valid. The error counter value is thus maintained at a zero value or possibly decremented.

The following message received by the security module has the reference ECM2(C1). It is received two cryptoperiods after the first message ECM1(C1), namely after 14 seconds in our example. This means that it is also received 4 seconds after the message ECM2(C2) corresponding to channel C2. This value of 4 seconds is lower than the cryptoperiod contained in the previous control message. The error counter value is thus incremented by 2 units, if the same rule as in the previous example is applied. This error counter CE value is thus 2.

The following message will be received after 4 cryptoperiods of channel C2, that is to say (4×5)−(2×7)=6 seconds after the last message received ECM2(C1). Since this message contained the value of 7 seconds for the cryptoperiod, the message ECM3(C2) is considered as incorrect and the error counter value is incremented by 2. It thus reaches the value 4.

The following message ECM3(C1) is received after (4×7)− (4×5)=8 seconds. The previous message contained the value of the cryptoperiod relating to that of channel C2, namely 5 seconds. The time duration of 8 seconds between the previous message is greater than this value of 5 seconds. The message is thus considered as correct. The error counter CE value will thus be decremented by one unit. By proceeding with the process in the way described above, it is possible to show that the error counter will be incremented then decremented alternatively. As the increment is carried out by means of jumps of two units and the decrement is carried out by means of jumps of one unit, this counter value will increase in the event of fraudulent use as represented in FIG. 6. This counter will take the values 0, 2, 4, 3, 5, 4, 6, 5, 7, . . . until it exceeds the threshold value from which a delay in the return of the control words is generated.

It should be noted that the case where the users only decrypt one control message of two, as described with reference to FIG. 6, represents the most unfavourable case in terms of the detection of fraudulent use. It is easy to observe that when the fraudulent users decrypt all the control messages ECM, the error counter value will increase more rapidly and the returning of the control words by the security module will according be delayed more rapidly.

Security Module and Paired Decoders

The rest of the description applies more particularly, but not exclusively, to the case in which the security module and the decoder forming a multimedia unit are paired. In this case, they each contain one key of an asymmetric key pair, this pair being different and unique for each security/decoder module unit. In this configuration, when a multimedia unit is activated, a session key that is generally symmetrical is negotiated between the security module and the decoder. This session key is used to encrypt the control words CW that have been decrypted by the security module, before being sent to the decoder. The use of such a session key poses a problem to fraudulent users using a splitter. In fact, since the session key between the security module/decoder pair 1 is different to the session key between the security module/decoder pair 2, it is necessary to negotiate a session key for each reception of a control message ECM on a different channel. In the case illustrated in FIG. 3 where the control messages are alternatively received on channel C1 and another channel C2, according to certain multimedia unit configurations, a session key must be negotiated between each reception of the control message ECM.

In order to generate the negotiation of such a session key, it is necessary to reset the security module. This is carried out by sending a reset command to the multimedia unit. Such a command can thus be sent between each control message ECM. In this case, it is important that the error counter CE value is not reset to zero. It is also desirable for this counter value to increase in the event that resetting to zero corresponds to a fraudulent use.

In order to carry this out, the security module memorises the most recent date that it has received in a volatile memory. This date is sent for example by a management centre in the form of a control message. On reception of a reset command, this date is memorised in a non-volatile memory.

Parallel to this, as already indicated, the control messages ECM contain a time stamp TS. The multimedia unit or more precisely the security module also memorises a time duration called "latency time" which in principle is greater or equal to a cryptoperiod.

On receipt of each control message ECM, the security module calculates the difference between the time stamp TS of this message ECM and the most recent date received before the last reset to zero, previously memorised in the non-volatile memory. If this difference is greater than the latency time, the error counter can be reset to zero or to a value for which there is no delay in the returning of the control words. If this difference is lower than the latency time, this means that the security module has decrypted a control message shortly before the reset to zero that may correspond to a configuration in which a splitter is used. The error counter is incremented according to a preset rule, for example of 3 units.

According to a first embodiment, from the moment in which a control message has been processed "shortly" before the resetting to zero or the last date memorised, that is to say in a time duration lower than the latency time, a delay time is introduced. This avoids the memorisation of the error counter value in a non-volatile memory. Instead, in the case of a "legal" resetting to zero for technical reasons, the genuine user must wait for the delay time to elapse before being able access the audio/video content. Moreover, if the channel is changed during this time, the counter value will increase.

According to another embodiment, the error counter value is stored in such a way that a reset command does not lead to the resetting to zero of the error counter. On the contrary, this value is maintained as it was before the reset to zero. In this way, a reset command between each control message ECM will rapidly prevent access to the audio/video content. On the contrary, an occasional reset to zero will not prevent access to the audio/video content as long as a sufficient number of control messages have been processed correctly between two consecutive resets to zero. In order to prevent any accumulative effect in normal circumstances, if the time between the first processing of a control message (after the reset to zero) and the time of the last processing prior to the reset to zero is sufficiently long (for example several hours) the error counter will reset to zero. The time necessary to carry out a reset to zero of the counter can be defined beforehand and is called idle time.

It should be noted that security modules, called multi-sessions, exist which are capable of memorising several session keys. In the case of normal use, each session key can dialogue with a multimedia unit, or even a sub-assembly for decrypting content that would be placed in the same apparatus.

During access to the security module by one of the decryption units, an identification reference will be added. The security module will process this message in an environment pertaining to this unit and which includes the session keys (if a pairing is active), the other identification data (rights, credit) and the data allowing the detection of fraudulent use as described above. In particular this concerns the error counter, of the time stamp of the last processing of a control message and the value of the cryptoperiod.

Therefore, the same security module can process several decrypting units by verifying that the total number of decoders associated to this module does not exceed the established limit. This limit can be set according to the user profile.

Incrementation/Decrementation at Different Speeds

In the examples indicated, the counter value is incremented more rapidly than it is decremented. It increases for example by two units when the difference between the time stamp of two successive control messages is lower than the cryptoperiod. It increases by three units for each reset to zero considered as incorrect while it only decreases one unit for each correct reception. This makes it possible to avoid the particular cases in which, by exploiting the resetting to zero and the correct processing of control messages, it is possible to maintain the error counter value within a range in which fraudulent users may always or nearly always access the audio/video content.

According to another alternative, it is possible to make provision for decrementation to be carried out faster than incrementation.

Delay Duration in Steps

As previously indicated, provision is generally made to introduce a delay when the error counter value reaches a certain threshold. Beyond this threshold, the delay can be proportional to the content of the counter or can increase in steps or be fixed. Generally, this delay is provided in order to prevent access to a part of the audio/video content during a certain time of fraudulent use, then to the totality of the audio/video content after a greater period of fraudulent use.

In the examples described previously, it is indicated that the time duration of the cryptoperiod of a control message is extracted together with its time stamp and then verification is carried out at the time of the reception of the following message to confirm whether the difference between the time stamp of this message and of the previous is equal to or lower than the cryptoperiod. This means that it must memorise the cryptoperiod and the time stamp of the first message.

According to one variant, it is possible to calculate the difference between the time stamp of two consecutive control messages ECM1 and ECM2 and verify if this difference is equal to or lower than the cryptoperiod extracted from the second message received ECM2. This has the advantage that it is not necessary to memorise the cryptoperiod and it thus allows memory to be saved.

In the examples described, the error counter value can be comprised between 0 and a threshold value, for example 10 or can exceed this threshold value. Between 0 and the threshold, there is no time delay. Beyond the threshold, a delay is introduced. It is clear that it is possible to limit the maximum value of the counter, which allows a limit to be placed on the number of correct consecutives messages that must be decrypted in order to be able to pass under the threshold value again.

According to one variant, it is possible to invert the direction of the counter, which means that for each correct decryption, the counter is incremented while it is decremented during a fraudulent decryption. In this case, a delay time is introduced when the counter contains a value comprised between 0 and a threshold while no time delay is introduced if the value of the counter is beyond this threshold.

The examples described mention the use of two decoders for one security module. It is of course possible, for a fraudulent use, to connect more than two decoders to a security module through a splitter. According to the process of the invention, this will block access to the audio/video content even more rapidly since the error counter will be incremented even more rapidly.

The invention claimed is:

1. A method for controlling access to data encrypted by control words, the control words being received by a security module in control messages and returned to a processing unit for encrypted data, the method comprising the steps of:
   receiving a first control message comprising at least one control word;
   receiving a second control message consecutive to the first control message, the second message comprising at least one control word;
   determining a time duration separating the two consecutive control messages;

if the time duration is lower than a predefined time threshold, incrementing an error counter;

if the time duration is equal to or greater than said predefined time threshold, decrementing said error counter; and returning the at least one control word from the second control message to the processing unit after a waiting time that depends on a value of the error counter.

2. The method for controlling access according to claim 1, wherein the value of said predefined time threshold is contained in at least one of the control messages.

3. The method for controlling access according to claim 1, wherein the value of said predefined time threshold is contained in a management message.

4. The method for controlling access according to claim 3, wherein the value of said predefined time threshold is common to a plurality of services on which the encrypted data is broadcast.

5. The method for controlling access according to claim 1, wherein the value of said predefined time threshold is equal to a time duration during which the data is encrypted with the same control word.

6. The method for controlling access according to claim 1, wherein said first control message includes a time stamp, said second control message includes a time stamp, and the time duration separating the two consecutive control messages corresponds to a difference between the time stamps of the first and second control messages.

7. The method for controlling access according to claim 1, wherein the security module or the processing unit or both the security module and the processing unit contain a clock, and wherein a time duration separating the two consecutive control messages corresponds to a difference between the time of the reception of said first control message as determined by said clock and the time of the reception of said second control message as determined by said clock.

8. The method for controlling access according to claim 1, wherein the waiting time is zero when the error counter value is lower than a predefined error threshold.

9. The method for controlling access according to claim 1, wherein the incrementation of the error counter value is carried out according to a preset rule.

10. The method for controlling access according to claim 1, wherein the decrementation of the error counter value is carried out according to a preset rule.

11. The method for controlling access according to claim 1, wherein the incrementation of the error counter value is carried out according to a first preset rule, wherein the decrementation of the error counter value is carried out according to a second preset rule, and wherein the first preset rule for the incrementation of the error counter value and the second preset rule for the decrementation of the error counter value are different.

12. The method for controlling access according to claim 11, wherein the incrementation of the error counter value is faster than decrementation of the error counter value.

13. The method for controlling access according to claim 1, wherein, when said security module has been restarted, the method further comprises the steps of:
determining a first date corresponding to the last date received by the processing unit;
determining a second date corresponding to the reception date of a new control message;
calculating the difference between the first and second dates; and
if the difference is lower than a predefined latency time, incrementing the error counter value.

14. The method for controlling access according to claim 13, wherein, if the difference between the first and second dates is greater than a predefined idle time, the error counter is restarted.

15. The method for controlling access according to claim 1, wherein said first control message further contains a time stamp; wherein said second control message further contains control a time stamp; and wherein the determination of the time duration separating the reception of the two consecutive control messages is performed by calculating the difference between the time stamps of the first and second control messages.

16. A device for controlling access to data encrypted by control words, the control words being received by a security module in control messages and returned to a processing unit for encrypted data, the device comprising:
means for receiving a first control message comprising at least one control word;
means for receiving a second control message consecutive to the first control message, the second message comprising at least one control word;
means for determining a time duration separating the first and second control messages;
means for incrementing an error counter if the time duration is lower than a predefined time threshold;
means for decrementing said error counter if the time duration is equal to or greater than said predefined time threshold; and
means for returning the control word from the second control message to the processing unit after a waiting time depending on a value of the error counter.

17. The device for controlling access to data according to claim 16, wherein said first control message further contains a time stamp; wherein said second control message further contains a time stamp; and wherein the means to determine a time duration separating the two consecutive control messages comprise means for calculating the difference between the time stamps of the first and second control messages.

* * * * *